United States Patent
Hans et al.

(10) Patent No.: US 10,590,289 B2
(45) Date of Patent: Mar. 17, 2020

(54) USE OF POLYHYDROXYALKANOATES AS ADDITIVES IN COATING COMPOSITIONS

(75) Inventors: Marc Hans, Wesel (DE); Wojciech Jaunky, Wesel (DE); Albert Frank, Xanten (DE); Petra Lenz, Willich (DE); Hendrik Luttikhedde, Markelo (NL)

(73) Assignee: BYK-Chemie GmbH, Wesel (DE)

( * ) Notice: Subject to any disclaimer, the term of this patent is extended or adjusted under 35 U.S.C. 154(b) by 1229 days.

(21) Appl. No.: 13/979,343

(22) PCT Filed: Jan. 12, 2012

(86) PCT No.: PCT/EP2012/050410
§ 371 (c)(1),
(2), (4) Date: Sep. 25, 2013

(87) PCT Pub. No.: WO2012/098041
PCT Pub. Date: Jul. 26, 2012

(65) Prior Publication Data
US 2014/0024748 A1    Jan. 23, 2014

(30) Foreign Application Priority Data
Jan. 17, 2011  (EP) ..................................... 11151181

(51) Int. Cl.
C09D 7/65   (2018.01)
C09D 7/42   (2018.01)

(52) U.S. Cl.
CPC ............... *C09D 7/65* (2018.01); *C09D 7/42* (2018.01)

(58) Field of Classification Search
CPC ............ C09D 7/005; C09D 7/125; C08F 2/48
See application file for complete search history.

(56) References Cited

U.S. PATENT DOCUMENTS

| | | | |
|---|---|---|---|
| 5,747,584 A | 5/1998 | Noda | |
| 7,488,382 B2 | 2/2009 | Schubert et al. | |
| 8,012,253 B2 | 9/2011 | Schubert et al. | |
| 2001/0034405 A1* | 10/2001 | Taylor | C09D 167/04 524/599 |
| 2003/0154885 A1 | 8/2003 | Krendlinger et al. | |
| 2005/0112171 A1* | 5/2005 | Tang et al. | 424/423 |
| 2007/0088099 A1 | 4/2007 | Mentink et al. | |
| 2007/0218291 A1* | 9/2007 | Chiou | C08G 18/6216 428/411.1 |
| 2008/0254209 A1 | 10/2008 | Dorgan | |
| 2012/0220699 A1* | 8/2012 | Choudhery | C08J 3/05 524/41 |

FOREIGN PATENT DOCUMENTS

| | | |
|---|---|---|
| DE | 4040158 A1 | 6/1992 |
| EP | 0030289 A2 | 6/1981 |
| EP | 1398301 A2 | 3/2004 |
| EP | 1837363 A1 | 9/2007 |
| EP | 0772654 A1 | 5/2014 |
| JP | 01234474 A | 9/1989 |
| JP | 10503227 A | 3/1998 |
| JP | 2004018723 A | 1/2004 |
| WO | WO-1996003468 A1 | 2/1996 |
| WO | WO-2001071093 A1 | 9/2001 |
| WO | WO-2006026546 A2 | 3/2006 |
| WO | WO-2008/068003 A1 | 6/2008 |

OTHER PUBLICATIONS

Honma et al., machine English translation of JP 2004-018723 (Jan. 22, 2004).*
Haubl et al., machine English translation of DE 4040158 (Year: 1990).*
"International Application No. PCT/EP2012/050410, Chapter II Demand and Response to Written Opinion dated Sep. 20, 2012", (dated Sep. 20, 2012), 14 pgs.
"International Application No. PCT/EP2012/050410, International Preliminary Report on Patentability dated Mar. 14, 2013", (dated Mar. 14, 2013), 7 pgs.
"International Application No. PCT/EP2012/050410, International Search Report and Written Opinion dated Apr. 17, 2012", (dated Apr. 17, 2012), 13 pgs.
"International Application No. PCT/EP2012/050410, Second Written Opinion dated Nov. 8, 2012", (dated Nov. 8, 2012), 6 pgs.
Reddy, C.S.K., et al., "Polyhydroxyalkanoates: an overview", Bioresource Technology 87(2) (2003) 137-146, (Apr. 2003), 137-146.
"International Application No. PCT/EP2012/050410, English Translation of International Preliminary Report on Patentability dated Jul. 18, 2013", 10 pgs.
Bieleman, Johan, "Additives for Coatings", Bielemann (Hrsg.), Wiley-VCH, Weinheim, Kapitel 5.2 Matting, Seiten 146-162, (2000), 19 pgs.
Chen, Guoqiang, et al., "Microbial production of biopolyesters-polyhydroxyalkanoates", Progress in Natural Science vol. 10, No. 11, (Nov. 2000), 8 pgs.
Florio, John, et al., "Handbook of Coatings Additives", Second Edition King Industries Inc. Marcel Dekker, Inc., (2004), 61 pgs.
Kittel, H, "Lehrbuch der Lacke und Beschichtungen", Band 5, Pigmente, Füllstoffe und Farbmetrik, 2. Auflage, Spille (Hrsg.), S. Hirzel Verlag, Seiten 423-430., (2003), 9 pgs.

(Continued)

Primary Examiner — Jessica M Roswell
(74) Attorney, Agent, or Firm — Schwegman Lundberg & Woessner, P.A.

(57) ABSTRACT

The present invention relates to the use of polyhydroxyalkanoates as additives in coating compositions and also to coating compositions comprising polyhydroxylalkanoates as matting agents. The present invention further relates to coatings produced with the coating composition of the invention, comprising polyhydroxyalkanoates, on a substrate.

11 Claims, No Drawings

(56) References Cited

OTHER PUBLICATIONS

Steinbuchel, Alexander, "Perspectives for Biotechnological Production and Utilization of Biopolymers: Metabolic Engineering of Polyhydroxyalkanoate Biosyntheses Pathways as a Successful Example", Macromolecular Bioscience, (2001), 24 pgs.
Verlag, George Thieme, "Rompps Chemie Lexikon", 9. Erweiterte Auflage Stuttgart, Band 5, Seiten 3536-3538, (1995), 6 pgs.
Von Ulrich Zorll, Herausgegeben, "Lacke und Druckfarben", Römpp Lexikon Thieme Verlag S. 472, (1998), 4 pgs.

* cited by examiner

USE OF POLYHYDROXYALKANOATES AS ADDITIVES IN COATING COMPOSITIONS

PRIORITY CLAIM TO RELATED APPLICATIONS

This application is a national stage application under 35 U.S.C. § 371 of PCT/EP2012/050410, filed Jan. 12, 2012, and published as WO 2012/098041 A1 on Jul. 26, 2012, which claims priority to European Patent Office Application No. 11151181.2, filed Jan. 17, 2011, which applications and publication are incorporated by reference as if reproduced herein and made a part hereof in their entirety, and the benefit of priority of each of which is claimed herein.

FIELD OF THE INVENTION

The present invention relates to the use of polyhydroxyalkanoates (PHA) as additives in coating compositions. The present invention further relates to coating compositions comprising PHA. The present invention also relates to coatings produced with the coating compositions comprising PHA.

PRIOR ART

In the field of the coatings industry it is conventional practice to use inorganic particles such as, for example, highly porous, amorphous silicon dioxide as additives in coating compositions, especially transparent varnishes (clearcoats), in order thereby to reduce the gloss, for example. The reduction in gloss or increase in matting endows the coatings with a particular optical profile which by virtue of its special character is nowadays becoming more and more popular. The most widely known and commonly employed types of these silicon dioxide particles are obtained by gelling or precipitation of silicas. The resultant silicon dioxide is subsequently washed, dried, and ground. Another type of silicon dioxide particle is produced by agglomeration of pyrolytic silicon dioxide, which can be carried out in a variety of ways. This latter type (for example, Acematt TS 100 from Evonik) possesses a significantly increased matting efficiency (10% to 15%) in comparison to the aforementioned particles. In order to obtain a particular level of matting, therefore, a substantially smaller fraction of particles in the respective coating composition is necessary than in the case of the former types of particle.

However, the product type with increased matting efficiency, if used in coating compositions, such as varnishes, leads to a very sharp increase in the viscosity. This unwanted effect of viscosity increase occurs even at the kind of low particle concentrations which are the minimum necessary for achieving the same matting effect as with other products, such as the particle types described earlier on above, for example. The increased matting efficiency therefore runs counter to the sharp increase in viscosity. Frequently moreover, there are adverse influences observed on the mechanical properties of the coating compositions and/or coatings. For further details, reference may be made to "Lackadditive, Johan Bieleman, Weinheim, N.Y.; Chichester; Brisbane; Singapore; Toronto; Wiley, 1998".

Likewise known is the use of certain waxes as matting agents in coating compositions. Such waxes generally possess a lower matting efficiency than the above-described silicon dioxide particles. There are a variety of approaches for increasing the matting efficiency of these waxes. For instance, US 2003/0154885 A1 describes the use of mixtures of specific waxes for the purpose of improving various properties of coating compositions. One of the approaches addressed is that of improving the matting efficiency. The mixtures comprise a homopolymer or copolymer of $C_2$-$C_{18}$ α-olefins, prepared by means of metallocene catalysis, and also at least one other wax selected from the group of various known waxes. A disadvantage, however, is that in certain coating systems the waxes may only possess a low level of dispersibility.

WO 2008/068003 A1 describes a combination of silicon dioxide particles with waxes. It uses silicon particles coated with waxes as matting agents.

Likewise known is the use of special aliphatic polyurethanes and highly crosslinked acrylic ester beads as matting agents (available, for example, from Microchem, Switzerland). In addition, matting agents of this kind lead to film surfaces which are particularly soft and pleasant to the touch. Owing to the reduced matting efficiency of these matting agents by comparison with the above-described silicon dioxide particles, relatively large amounts are required.

Also described are organic matting agents based on polymethylureas (available, for example, under the trade name Pergopak). These resins afford a good matting effect in a variety of coating systems. Moreover, good mechanical resistance and surfaces pleasing to the touch are achieved in finished coatings.

An ever more relevant problem in connection with synthetic polymers based on petrochemical raw materials, such as the aforementioned waxes and organic matting agents, for example, is their low biodegradability. The environmental accumulation to which this gives rise causes an environmental burden. For this reason, PHA are being accorded increasingly great importance as an alternative raw materials source for synthetic polymers. Synthetic polymers of this kind based on PHA, in contrast to polymers based on petrochemical raw materials, possess an appropriate biodegradability. PHA are polyesters which are synthesized by various bacteria and utilized by them as a carbon and energy source when nutrients are scarce. Poly-3-hydroxybutyrate (P-3HB) is the best-known and most investigated PHA. By corresponding feed supply in fermentation processes, and subsequent purification, P-3HB-based copolymers can be obtained which as well as 3-hydroxybutanoic acid may include different monomers such as 3-hydroxyvaleric acid, 4-hydroxybutanoic acid and/or various $C_6$-$C_{16}$ 3-hydroxy-fatty acids, for example. PHA are used for the production of biodegradable plastic materials which are employed, for example, as packaging materials.

Problem

A problem addressed by the present invention was that of finding a new possibility for increasing the matting efficiency of coating compositions or for increasing the level of matting in coatings constructed with coating compositions, in order thereby to achieve the matted optical profile of coatings, which is nowadays ever more popular on account of its specific appearance. At the same time, moreover, further important quality features of coating compositions, or of coatings constructed using coating compositions, ought to be met and/or improved. More particularly, typical properties of coating compositions and coatings ought to be improved, such as the viscosity, the flow, the scratch resistance, the transparency, and the blocking resistance, and also the tactile qualities of coatings. A weighted balance between the stated properties, in particular, ought to be obtained. The stated properties, especially the matting efficiency or level of mattness, ought to be achieved by means of particular additives, admixed to the coating compositions, which are not based on petrochemical raw materials. As a result, the amount of synthetic materials with only a low biodegradability in coating compositions and coatings ought in particular to be reduced, while nevertheless obtaining the outstanding properties described above, especially good matting efficiency.

Solution Provided by the Invention

In the context of the present invention it has been found that the problems formulated above can be solved through the use of polyhydroxyalkanoates.

The present invention accordingly provides the use of polyhydroxyalkanoates as additives in coating compositions.

The present invention further provides a coating composition comprising polyhydroxyalkanoates.

Additionally a coating produced on a substrate with the coating composition of the invention comprising polyhydroxyalkanoates is provided with the present invention.

Through the inventive use, a marked reduction in gloss in coatings, or an increase in the matting efficiency of coating compositions, is achieved. The coating compositions and coatings of the invention, furthermore, possess outstanding further properties, more particularly an only slightly increased viscosity, good flow, high scratch resistance, low transparency, and good blocking resistance, and also desirable tactile qualities. The PHA, moreover, are not based on petrochemical raw materials, and so the proportion of petrochemical materials in the coating compositions and coatings of the invention can be reduced while nevertheless the outstanding qualities described can be obtained.

DETAILED DESCRIPTION OF THE INVENTION

The PHA are used in accordance with the invention as additives, more particularly as matting or flatting agents, in coating compositions. As the skilled person in the art is aware, additives are commonly auxiliaries or substances which are added to a system—a coating composition, for example—in order to endow said system or a system produced from it, a coating, for example, with specific properties—for example, the abovementioned advantageous properties such as high degree of matting, high scratch resistance and/or enhanced tactility. For further details of this, refer to Römpp-Lexikon Lacke and Druckfarben, Georg Thieme Verlag, Stuttgart, N.Y., 1998, page 13. Depending on the use or field of application, therefore, the PHA are used inventively as different additives. For example, the PHA can be used as matting agents. Also possible, however, is their specific use as an additive for improving, for example, the haptic qualities, for specifically influencing the viscosity, for improving the scratch resistance, for optimizing the flow, or for increasing the blocking resistance. Naturally, the PHA can also be used as additives which influence or improve a number of different properties of coating compositions and/or coatings, such as a plurality of the properties identified above, for example. This means that the PHA may also, for example, be used as additives with a plurality of functions.

The PHA for use in accordance with the invention as additives, more particularly as matting agents, are a class of naturally occurring polyesters which, as is known, can be synthesized by different bacteria and can be isolated and/or purified by methods familiar to the skilled person.

Industrially, PHA are generally produced by fermentation using recombinant bacterial cultures. Their production by genetically modified plants or by anaerobic fermentation of biological wastes has likewise been described. For further details here, refer to "Polyhydroxyalkanoates: an overview; Bioresource Technology 87 (2003) 137-146". After the end of the fermentation process for producing the PHA, the product must be separated from the cellular biomass of the bacterial cultures used. Corresponding isolation methods and purification methods are described for example in "Chemistry and Technology of Biodegradable Polymers, G. J. L. Griffin, Springer; $1^{st}$ Edition (Dec. 31, 1993), ISBN-10: 0751400033". Following purification, the polyhydroxyalkanoates are obtained generally as a material which is in powder form at room temperature, in other words in a range from about 10° C. to 40° C., or powder. Powder, as is known, means a fine, divided mass of solid materials.

The PHA for use in accordance with the invention are based on hydroxycarboxylic acids as monomer building blocks, which have been polymerized to form polyesters. These monomers or hydroxycarboxylic acids are, in particular, 2-hydroxycarboxylic acids to 6-hydroxycarboxylic acids. This means, for example, that the hydroxyl group is located preferably at least in β-position relative to the carboxyl group of the monomer. The hydroxycarboxylic acids, moreover, may also have different substitution. Substituents which may be present include for example, but not exclusively, alkyl groups, variously functionalized alkyl, aryl, alkenyl, halogen, cyano, epoxy, ether, acyl, ester, and carboxyl groups, and also combinations of such groups. Preferred monomers present are those in which the PHA comprise at least one kind of the following structures as structural unit or monomer unit:

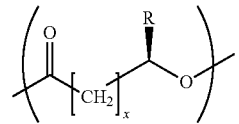

where:

x=1, 2, 3, or 4, more particularly 1 or 2, very preferably 1, and

R=H, alkyl, aryl, alkenyl, aralkyl, haloalkyl, halogen, cyano, or radical containing epoxy groups, ether groups, acyl groups, ester groups and/or carboxyl groups, more particularly H or alkyl, and if alkyl then preferably methyl or ethyl, more preferably methyl.

The expression structural unit or monomer unit means that in general a plurality of identical or different monomers, hydroxycarboxylic acids in the context of the present invention, are linked chemically in succession. In the context of the present invention, the chemical linkage comprises ester bonds. A monomer unit, therefore, is a monomer-derived unit in a polymer chain which is present in catenated linkage in the polymer chain with a plurality of further units derived from the same monomer or from different monomers.

PHA used with preference in the context of the present invention comprise one or more blocks each constructed from repeating structural units of the same monomer, the respective monomer being selected from the group consisting of 3-hydroxybutanoic acid, 4-hydroxybutanoic acid, 3-hydroxyvaleric acid, 3-hydroxyhexanoic acid and/or 3-hydroxyoctanoic acid. Employed with particular preference in accordance with the invention are PHA which comprise at least one of the following polymeric and/or copolymeric structures: poly-3-hydroxybutyrate (P-3HB), poly-3-hydroxy-butyrate-co-3-hydroxyvalerate (P-3HB-3HV), poly-3-hydroxybutyrate-co-4-hydroxybutyrate (P-3HB-4HB), and poly-3-hydroxybutyrate-co-3-hydroxyvalerate-co-4-hydroxybutyrate (P-3HB-3HV-4HB). One particularly preferred embodiment of the invention uses PHA which consist of one or more, preferably one, of the aforementioned polymers and copolymers.

The molecular weight of the PHAs for use in the context of the present invention may vary very widely. Thus, the mass-average molecular weights ($M_w$) of the PHA are situated for example in the range from 5000 to 2 000 000 g/mol (measured by means of gel permeation chromatography (GPC)). The mass-average molecular weights ($M_w$) of the PHA are situated preferably in the range from 80 000 to 300 000 g/mol (measured by means of GPC).

As already indicated above, following purification, the PHA are generally obtained as powders and can be used in accordance with the invention in that form for example.

In this way they are obtainable, for example, from a variety of suppliers (for example, Biomer, Germany; Tianan Biologic Material Co., China; Tianjin Green Bioscience Co., China). The material for the purposes of the present invention preferably comprises particles. In a particularly preferred embodiment, the PHA are used in the form of particles composed of agglomerations of smaller, primary particles, which if desired may be ground or micronized. In this way the particles or the powder, if desired, can be comminuted further and, optionally, a more specific, narrower particle size distribution is achieved. This is done using common grinding methods, examples being grinding using jet mills, bead mills, spiral-jet mills, and similar mills. The PHA are preferably micronized using a jet mill, to produce the PHA particles.

The PHA particles to be used advantageously preferably possess a defined particle size. In the context of the present invention, the particle size is indicated by means of a parameter $d_{50}$. This parameter means that 50 wt % of the particles possess a particle size which is smaller than or equal to the stated $d_{50}$ figure. The PHA particles preferably possess a particle size of $d_{50}$=0.05 μm to $d_{50}$=100 μm, more preferably of $d_{50}$=0.1 μm to $d_{50}$=50 μm, very preferably of $d_{50}$=0.5 μm to $d_{50}$=15 μm, and more particularly of $d_{50}$=1 μm to $d_{50}$=7 μm. By particle size is meant the diameter of the particles assumed in each case to be spherical (diameter approximation).

In the context of the present invention, particle size determination takes place by means of laser diffraction, a technique familiar to the skilled person. Particles which transmit a bundled light beam, such as a laser beam, for example, scatter the light. The angle at which the light is scattered is directly connected to the size of the particles and/or to their diameter. For detailed information concerning the measurement technique, reference may be made to the subsequent examples.

In the context of the inventive use in a coating composition, the PHA are used preferably with a fraction of 0.01 to 20 wt %, preferably 0.5 to 10 wt %, more particularly 1 to 8 wt %, based in each case on the total amount of the coating composition. There is either only one PHA or a mixture of two or more different PHA. With preference precisely one PHA is used.

The PHA may also be used in combination with other matting agents, such as those matting agents described above, for example.

Coating compositions employed in the context of the inventive use can be arbitrary. Different coating compositions and their constituents are described for example in "Lackrohstoff-Tabellen, E. Karsten/O. Lückert, Vincentz 2000 ISBN 3878705611" and "Pigment-und Füllstoff-Tabellen, O. Lückert, Vincentz 2002 ISBN 9783878707448". In every case, in the context of the inventive use, the coating composition comprises at least one typical polymeric resin as binder and also, optionally, a typical organic solvent and/or water, and also, optionally, further, typical coatings additives. The way and the quantities in which such constituents of coating compositions are selected is familiar to the skilled person in the art. Such selection can be made by the skilled person in any case on the basis of his or her art knowledge, in accordance with the requirements of the particular case in hand.

Polymeric resins as binders are for example, though not exclusively, the conventional polyurethane, polyester, polyester polyol, acrylic (such as polyacrylate and polymethacrylate), polyester acrylate, epoxy acrylate, polyether acrylate, urethane acrylate, epoxy and/or alkyd resins. For further details, refer here to Römpp-Lexikon Lacke und Druckfarben, Georg Thieme Verlag, Stuttgart, N.Y., 1998, pages 73-74. These polymeric resins may be self-crosslinking or externally crosslinking. This means, as is known, that the crosslinking functional groups of the resins may be present in one and the same resin or in different organic compounds. In the case of externally crosslinking systems, for example, amino resins and also monomeric and/or polymeric, blocked and/or free polyisocyanates may additionally be present as crosslinking agents, especially polyisocyanates, which may then react, for example, with hydroxyl groups in a polymeric resin, to form a film. In one preferred externally crosslinking system, at least one hydroxy-functional polymeric resin as binder, more particularly a hydroxy-functional polyester, is combined with at least one polyisocyanate as crosslinking agent.

Used more particularly as binders in the context of the inventive use are acrylic resins, polyester acrylate resins and/or polyester polyol resins. Particularly preferred embodiments in the case of waterborne coating compositions use an acrylic resin; in solventborne coating compositions, a combination of a hydroxy-functional polyester with at least one polyisocyanate; and, in solvent-free coating compositions, based purely on reactive diluents, which advantageously are radiation-curing in the context of the present invention, a polyester acrylate resin. The definitions that apply in the context of the present invention for the terms selected above, such as "solventborne", for example, can be found later on below.

The total fraction of the polymeric resins as binders and of the optionally present organic compounds as crosslinking agents in the coating compositions is dependent on the particular case in hand and may vary widely. In certain embodiments of the present invention, for example, the fraction may be in the range from 10 to 90 wt %, preferably from 15 to 80 wt %, very advantageously between 25 and 60 wt %, based in each case on the total amount of the coating composition. Also entirely possible, however, are lower or higher fractions, especially higher fractions, as for example when the coating composition is a powder coating material. In that case the fraction may be up to 99.5 wt %.

The coating composition may be physically and/or chemically curable and/or radiation-curing, depending, for example, on the nature of the polymeric resins and optionally crosslinkers that are used (in this regard, see, for example, Römpp-Lexikon Lacke and Druckfarben, Georg Thieme Verlag, Stuttgart, N.Y., 1998, pages 274 to 276 and pages 542 to 544). The coating composition may be a one-, two- or multi-component system. The skilled person knows how to select from the stated possibilities in accordance with the requirements in each individual case.

The coating composition optionally comprises a solvent. Solvents employed are the typical organic solvents known to the skilled person—for example, but not exclusively, aliphatic, cycloaliphatic, aromatic solvents, typical ethers, esters and/or ketones, such as, for example, butyl glycol, butyl diglycol, butyl acetate, methyl isobutyl ketone, and methyl ethyl ketone. Likewise employed as solvent is water. The coating composition may for example be waterborne or solventborne. In the context of the present invention, waterborne means that the coating composition comprises primarily water as solvent. In the case of a waterborne coating composition, more particularly, not more than 20 wt %, more particularly not more than 10 wt %, of organic solvents are present in the coating composition, based on the total amount of solvents.

A coating composition is considered solventborne for the purposes of the present invention when it includes not more than 10 wt %, preferably not more than 5 wt %, especially preferably not more than 2 wt %, of water, based on the total amount of solvents. In comparison to the proportions indicated above that substantiate the waterborne or solventborne character, the coating composition may of course also include more balanced proportions or ratios of organic solvents and water.

The fraction of solvent in the coating composition may lie for example in the range of 0-84.99 wt %, based on the total amount of the coating composition.

Instead of the solvent or additionally to the solvent, optionally, the coating composition comprises a reactive diluent. Reactive diluents employed are the typical compounds, known to the skilled worker and generally of low viscosity, which have a diluent effect on the coating composition and by chemical reaction remain in the film. For example, the mono-, di- and/or triacrylates known to the skilled worker may be used in radiation-curing systems, for example, as reactive diluents—such as dipropylene glycol diacrylate for example. For further details, refer here to Römpp-Lexikon Lacke and Druckfarben, Georg Thieme Verlag, Stuttgart, N.Y., 1998, page 491.

The coating composition may for example also be a powder coating material. Powder coating materials are organic, usually thermoset coating powders with a solids fraction of 100%. Coating with powder coating materials does not require any solvents.

A particular advantage is that for the purposes of the inventive use it is possible for not only waterborne and solventborne but also solvent-free coating compositions to be employed, such as, for example, powder coating materials or coating compositions based on reactive diluents. The broad-spectrum applicability of the inventive use is therefore very great.

Moreover, the coating composition for use in the context of the present use may further comprise pigments or fillers. The selection of such pigments or fillers may be performed by the skilled person in accordance with the requirements of the case in hand. For further details, refer for example to Römpp-Lexikon Lacke and Druckfarben, Georg Thieme Verlag, Stuttgart, N.Y., 1998 (pages 250 to 252 and also 451 to 453).

Preferably, however, the coating compositions for use are substantially free from pigments and fillers. More particularly, the coating compositions for use are transparent varnishes.

Furthermore, the coating composition for use in the context of the present use may further comprise various coatings additives. Such coatings additives are known to the skilled person and may be selected by him or her on the basis of his or her art knowledge and in accordance with the requirements of the case in hand. Use may be made for example, but not exclusively, of photoinitiators, defoamers, wetting agents, film-forming assistants such as cellulose derivatives (for example cellulose nitrate and cellulose acetate), flow control agents, dispersants, and/or rheology control additives.

Further provided by the present invention is a coating composition comprising PHA. The embodiments and preferred embodiments described earlier on above in the context of the inventive use, with regard to the PHA to be used and to the coating compositions, also apply, correspondingly, to the inventive coating composition comprising PHA.

The coating composition is produced using processes familiar to the skilled person, with no peculiarities of preparation. The known techniques are employed, such as the gradual addition, with stirring and mixing, of the constituents of the coating composition, in customary and known mixing assemblies such as stirred tanks or dissolvers, for example.

Likewise provided by the present invention is a coating produced with the coating composition of the invention.

The coating is produced by applying the coating composition of the invention to a substrate and subsequently curing the applied coating composition.

The production of the coating as well takes place via techniques of application to a substrate, and subsequent curing methods, that are familiar to the skilled person.

Application is accomplished for example, but not exclusively, by the known spraying, injecting, spreading, rolling, pouring, impregnating and/or dipping methods.

Following the application of the coating composition to a substrate, curing takes place according to commonplace techniques. For example, the applied coating composition may be physically drying, curable thermally and/or using actinic radiation (radiation-curing), preferably by UV radiation and also electron beams. Thermal curing may be accomplished, for example, in the range from about 10° C. up to about 250° C., depending on the nature of the coating composition and/or of the substrate. The duration of curing as well is dependent individually, for example, on the nature of the curing method (thermal or actinic), on the nature of the coating composition used, and/or on the substrates. By way of example, curing may last for between 1 minute and several hours or even days, as for example up to 10 days. The substrate here may be moving or else at rest. The curing conditions can be readily adapted by the skilled person to each individual case, on the basis of his or her art knowledge.

The film thicknesses are 3 µm to 5 mm, preferably 10 µm to 2 mm. Here again, the determining factors in each case are the conditions present on an individual basis, and also the individual sphere of application.

Substrates that can be employed in the context of the present invention are any conceivable substrates for coating compositions. More particularly, though not exclusively, the coatings of the invention are applied to metal, glass, plastics, wood, leather, synthetic leather, ceramics, paper, and textiles in various configurations and forms.

The coating of the invention may be a one-coat coating or a multi-coat coating. In the case of a multi-coat coating, the coating compositions with which the individual coats of the coating of the invention are produced may be the same or different. Essential to the invention, however, is that at least one of the coating compositions used is a coating composition of the invention, i.e., comprises PHA.

Through the inventive use, success is achieved in obtaining excellent matting efficiency in coating compositions, or an outstanding level of mattness in coatings. The significant reduction in gloss is accompanied by other outstanding properties such as only slight increase in viscosity, good flow, high scratch resistance, transparency, and good blocking resistance, and also desirable tactile qualities. An outstanding balance is achieved between the aforementioned properties. Moreover, the PHA used in accordance with the present invention are readily biodegradable and hence more eco-friendly than, for example, matting agents based on petrochemical raw materials. The advantageous properties described are apparently likewise applicable to the coating composition of the invention and to the coating of the invention.

The invention is described in more detail below, using examples.

EXAMPLES

A)

PHA from various suppliers were micronized by jet mill to different intensities, producing PHA particles. Particles with different size distributions were obtained here. The particle sizes or size distributions were measured by laser diffraction using a Sympatec HELOS/BF measurement system, equipped with a Sympatec RODOS dry dispersing system, at 23° C.

Table 1 summarizes the corresponding data for the micronized PHA particles. The PHA particles were used in different coating compositions, based on three different coating systems, as additives or matting agents (compare C)).

TABLE 1

Micronized PHA particles

| No. | Supplier | PHB[1] | Particle size distribution | | |
|---|---|---|---|---|---|
| | | | $D_{10}$ | $D_{50}$ | $D_{99}$ |
| Example 1 | Biomer (Germany) | P-3HB | 1.04 | 3.86 | 13.9 |
| Example 2 | Biomer (Germany) | P-3HB | 1.07 | 3.64 | 14.8 |
| Example 3 | Biomer (Germany) | P-3HB | 1.28 | 6.17 | 31.6 |
| Example 4 | Tianan Biologic Material Co. (China) | P-3HB-3HV | 1.24 | 4.85 | 22.2 |
| Example 5 | Tianjin Green Bioscience Co., Ltd. (China) | P-3HB-4HB | 1.36 | 5.08 | 17.1 |

[1]PHBs for inventive use
P-3HB = poly(3-hydroxybutyrate)
P-3HB-3HV = poly(3-hydrdoxybutyrate-co-3-hydroxyvalerate)
P-3HB-4HB = poly(3-hydroxybutyrate-co-4-hydroxybutyrate)

As well as the PHBs as per Table 1, typical, silicon dioxide-based matting agents, available commercially, were employed in coating compositions (likewise see under C)). Also employed were commercially available waxes as matting agents (compare likewise C)). Tables 2 and 3 summarize the corresponding data for the conventional matting agents employed.

TABLE 2

Typical silicon dioxide-based matting agents

| Name | Supplier | Description |
|---|---|---|
| Acematt TS 100 [1] | Evonik Industries | unmodified |
| Acematt OK 412 [2] | Evonik Industries | organically modified |
| Syloid ED 30 [3] | W. R. Grace & Co. | organically modified (10% wax) |
| Syloid ED 40 [3] | W. R. Grace & Co. | organically modified (10% wax) |
| Syloid RAD 2105 [3] | W. R. Grace & Co. | organically modified (20% special organic modification) |
| Sylysia 256 NF [3] | Sylisiamont S.p.A. | organically modified |

[1] produced on basis of pyrolytic silicon dioxide
[2] produced by precipitation
[3] produced by gelling

TABLE 3

Typical wax matting agents

| Name | Description |
|---|---|
| AQUAMAT 270 | nonionic dispersion of a modified polyethylene wax |
| AQUACER 539 | nonionic emulsion of a modified paraffin wax |
| CERAFLOUR 920 | micronized organic polymer |
| CERAFLOUR 928 | micronized modified polyethylene wax |
| CERAFLOUR 988 | micronized, amide-modified polyethylene wax |
| CERAFLOUR 994 | ultrafine micronized amide wax |
| CERAFLOUR 996 | micronized, polyethylene-modified polytetrafluoroethylene wax |

B)

Using the matting agents indicated under A), different coating compositions were produced. These coating compositions were used to produce coatings on different substrates (compare C)).

Different properties of the coating compositions and coating were investigated. The properties investigated and the analytical methods associated with these investigations are described below:

The flow, cratering, foaming, and transparency of the (applied and cured) coatings were assessed visually on contrast cards and/or glass plates. (Ratings 1 to 5, 1=very good, 5=deficient; for transparency, 5=very low). Visual assessments were likewise made of the appearance and of the homogeneity of the coating composition.

The tactile qualities of the coatings were likewise investigated. In this case, six people felt the coatings on the corresponding substrates and assessed them in accordance with the following evaluation: ratings 1 to 5, 1=feels very pleasant, velvety; 5=feels unpleasant, rough.

The gloss of the coatings was measured on contrast cards, using a Micro-TRI-Gloss μ gloss meter from Byk-Gardner (60° geometry). High values correspond to high gloss.

The haze and the distinctness of image of the coatings was measured on polyester films (Melinex O) using a haze-gard plus instrument (Byk-Gardner).

The haze derives from diffuse reflection of light at the surface at angles deviating from the principal direction of reflection of the incident light beam, with the surface viewed taking on a milky haze. ASTM D 1003 defines the haze as the percentage fraction of light that is reflected at angles which deviate by more than 2.5° from the incident light from the principal direction of reflection.

The distinctness of image (or transmission sharpness) is dependent on the light which is scattered at comparatively high intensity at very small angles deviating from the principal plane of reflection. The effect describes the precision with which fine details can be viewed through the sample in question. The distinctness of image is measured at angles which deviate by less than 2.5° from the principal plane of reflection (Byk-Gardner catalog 2007-2008).

For the haze and distinctness of image values determined separately from one another using the haze-gard plus instrument, high values in each case correspond to a high haze or a high distinctness of image, respectively.

The blocking resistance of coatings was determined on contrast panels. The coated contrast panels (test strips with an areal size of 5×10 cm) were bent in the middle and the coated bend areas were pressed together (1 h, 60° C., loading weight 1 kg). Blocking resistance is good when the areas pressed together can be parted from one another again easily and without damage to the coating. Again, a rating system of 1 to 5 was applied (see above).

The viscosity of the coating compositions was measured at a temperature of 23° C., using a rheometer StressTech instrument (Reologica) at a shear rate of 10 l/s.

The coefficient of friction (COF) of the coatings was measured at 23° C. on glass plates using an Altek model 9505 AE (0.5 kg weight load) under conditions which were constant in each case.

Low values correspond to a surface with a smooth feel (in this regard, see also "Kittel, Lehrbuch der Lacke und Beschichtungen, Analyse und Prüfungen, volume 10, S. Hirzel Verlag Stuttgart, 2006, pages 568 to 569").

The scratch resistance was measured by means of the SATRA abrasion test on contrast cards. The figure reported is the number of rub cycles using a felt plaque until the first scratch tracks became visible. Furthermore, the gloss was measured before and after the test (60° geometry, see above).

TABLE 4

Coating system 1), radiation-curing, reactive diluent-based coating system

| Constituent | Amount (in wt %, based on total formulation) |
| --- | --- |
| Laromer PE 56 F | 50.6 |
| Laromer DPGDA | 44.6 |
| BYK-UV 3570 | 0.1 |
| BYK-1790 | 0.2 |
| Irgacure 500 | 4.2 |

Laromer PE 56 F: unsaturated polyester acrylate resin

Laromer DPGDA (dipropylene glycol diacrylate, acrylic ester as reactive diluent (BASF))

BYK-UV 3570: polyester-modified, acryloyl-functional polydimethylsiloxane as reactive flow control additive BYK-1790: silicone-free antifoam-former Irgacure 500: mixture of two photoinitiators (BASF)

The constituents of coating system 1 were mixed gradually in the sequence indicated above, with stirring, in a dissolver. Then different matting agents from those indicated under A) were added, and dispersion took place for 10 minutes with stirring. The matting agents used and their weight fractions (wt %), based in each case on the total weight of the respective formulation, are evident from Table 5.

The coating compositions produced in this way were applied using a 25 μm wire doctor to contrast charts, and using a 25 μm four-way bar applicator to glass plates.

This was followed by curing of the applied coating compositions, by means of UV radiation (UV curing system IST, belt speed 5 m/min, mercury lamp, 120 W/cm).

Table 5 summarizes different properties and test results found for the coating compositions and coatings produced.

TABLE 5

Properties of coating compositions and coatings, based on coating system 1

| Additive | Appearance/ homogeneity | Craters | Transparency | COF | Tactile | Gloss, 60° |
| --- | --- | --- | --- | --- | --- | --- |
| Control (no matting agent) | ok | 4 | 1 | 0.40 | 5 | 91 |
| 5% Acematt OK412 | sedimentation | 1 | 4 | 0.52 | 2 | 54 |
| 5% Syloid ED 30 | sedimentation | 1 | 3 | 0.52 | 2 | 49 |
| 5% Acematt TS 100 | ok | 2 | 1-2 | 0.46 | 3 | 41 |
| 5% CERAFLOUR 994 | bodying | 1 | 5 | 0.44 | 3 | 31 |
| 5% CERAFLOUR 920 | ok | 4 | 4-5 | 0.42 | 3 | 55 |
| 5% Example 1 | ok | 1-2 | 2 | 0.40 | 1-2 | 30 |
| 5% Example 2 | ok | 1 | 2 | 0.42 | 1 | 34 |
| 5% Example 3 | ok | 2 | 2-3 | 0.46 | 1-2 | 40 |
| 5% Example 4 | ok | 1-2 | 2 | 0.44 | 1 | 38 |
| 5% Example 5 | ok | 1-2 | 4 | 0.39 | 2-3 | 39 |
| 2.5% Acematt TS 100 2.5% Example 1 | ok | 2-3 | 2 | 0.40 | 2 | 35 |
| 2.5% CERAFLOUR 994 2.5% Example 1 | bodying, sedimentation | 1 | 4 | 0.50 | 3 | 33 |

C)

Production of coating compositions and coatings, and their investigation

All of the preparations and investigations described below were carried out at 25° C.

C1) Coating System 1

Coating compositions and coatings were produced on the basis of coating system 1 (see Table 4).

The coating compositions of the invention comprising PHA exhibit a homogeneous appearance without sedimentation or bodying. The properties of the inventive coatings as well, especially the matting efficiency, are similar to or even better than the properties of conventional coatings. Overall, with the coating compositions and coatings of the invention, an outstanding balance is apparent between different properties, this balance being in some cases much better than for conventional coating compositions and coatings.

Furthermore, the effect of the matting agents used on the viscosity of the coating compositions was ascertained (Table 6). The matting agents used and their weight fractions (wt %), in each case based on the total weight of the respective formulation, are indicated likewise.

TABLE 6

Effect of matting agents on the viscosity of coating composition based on coating system 1

| Additive | Viscosity [mPa*s] |
| --- | --- |
| Control (no matting agent) | 343 |
| 5% Acematt TS 100 | 1090 |
| 5% CERAFLOUR 920 | 599 |
| 5% Example 1 | 561 |

In comparison to the use of typical matting agents, especially those based on silicon dioxide, the use of the PHA for use in accordance with the invention results in a substantially lower increase in viscosity in the coating materials.

C2) Coating System 2

Coating compositions and coatings were produced on the basis of coating system 2 (see Table 7).

TABLE 7

Coating system 2), waterborne coating system

| Constituent | Amount (in wt %, based on total formulation) |
| --- | --- |
| Setaqua 6756 | 90.9 |
| Water | 5 |
| Butylglycol | 1.8 |
| Butyldiglycol | 1.8 |
| BYK-093 | 0.3 |
| BYK-346 | 0.2 |

Setaqua 6756 (Nuplex Resins): dispersion of a self-crosslinking acrylic resin
BYK-093: mixture of foam-destroying polysiloxanes and hydrophobic solids in polyglycol
BYK-346: polyether-modified siloxane The constituents of coating system 2 were mixed gradually in the sequence indicated above, with stirring, in a dissolver. Then different matting agents from those indicated under A) were added, and dispersion took place for 10 minutes with stirring. The matting agents used and their weight fractions (wt %), based in each case on the total weight of the respective formulation, are evident from Table 8.

The coating compositions produced in this way were applied using a 100 μm wire doctor to contrast charts, and using a 100 μm four-way bar applicator to glass plates.

The samples were subsequently stored at 25° C. for a week, for the coating compositions to cure.

Table 8 summarizes different properties and test results found for the coating compositions and coatings produced.

TABLE 8

Properties of coating compositions and coatings, based on coating system 2

| Additive | Appearance/homogeneity | Transparency | COF | Tactile | Gloss, 60° |
| --- | --- | --- | --- | --- | --- |
| Control (no matting agent) | ok | 1 | 0.44 | 5 | 88 |
| 2% Example 4 | ok | 2-3 | 0.32 | 2-3 | 32 |
| 2% CERAFLOUR 920 | ok | 4 | 0.30 | 2 | 33 |
| 2% CERAFLOUR 928 | ok | 5 | 0.30 | 4 | 31 |
| 2% Sylysia 256NF | ok | 5 | 0.30 | 3 | 26 |

TABLE 8-continued

Properties of coating compositions and coatings, based on coating system 2

| Additive | Appearance/homogeneity | Transparency | COF | Tactile | Gloss, 60° |
| --- | --- | --- | --- | --- | --- |
| 1% Sylysia 256NF 1% Example 1 | ok | 3-4 | 0.32 | 2 | 33 |
| 1% CERAFLOUR 920 1% Example 1 | sedimentation | 3 | 0.32 | 2 | 33 |

The inventive use of PHA results in properties of similar quality to those when using conventional matting agents; in particular, good matting efficiency is obtained. The combination of an inventively employed PHA with a silicon dioxide-based matting agent exhibits advantageous properties.

Investigations were likewise made of flow, foam formation, and scratch resistance of coating compositions and coatings produced, on the basis of coating system 2 (compare Table 9). The matting agents used and also their weight fractions (wt %), based in each case on the total weight of the respective formulation, are likewise indicated.

TABLE 9

Flow, foam formation, and scratch resistance of coating compositions and coatings based on coating system 2

| | | | | Gloss 60° | |
| --- | --- | --- | --- | --- | --- |
| Additive | Flow | Foam formation | SATRA, cycles | before SATRA | after SATRA |
| Control (no matting agent) | 1-2 | 1 | <500 | 90 | 82 |
| 2% AQUAMAT 270 [1] | 3 | 1 | >4000 | 46 | 49 |
| 2% Example 1 | 1-2 | 1 | >4000 | 38 | 45 |

[1] based on the solids fraction of the AQUAMAT 270 dispersion used

Again, improved properties, more particularly an improved matting efficiency and an improved flow, are observed for the coating compositions and coatings of the invention, in comparison to conventional coating compositions and coatings.

Further coating compositions and coatings based on coating system 2 were investigated for cratering, flow, and blocking resistance (compare Table 10). The matting agents used and also their weight fractions (wt %), based in each case on the total weight of the respect formulation, are likewise indicated.

TABLE 10

Cratering, flow, and blocking resistance of coating compositions and coatings based on coating system 2

| | Craters | Flow | Blocking resistance |
| --- | --- | --- | --- |
| Control | 1 | 1 | 5 |
| 1% AQUACER 539 [1] | 1 | 1 | 1 |
| 1% Example 1 | 1 | 1 | 1 |

[1] based on the solids fraction of the AQUACER 539 emulsion used

The coating compositions and coatings of the invention exhibit properties comparable with those of coating compositions and coatings comprising conventional matting agents based on petrochemical raw materials.

C3) Coating System 3

Coating compositions and coatings were produced on the basis of coating system 3 (compare Table 11).

TABLE 11

Coating system 3), solventborne two-component coating system

| Constituent | Amount (in wt %, based on total formulation) |
|---|---|
| A) Component 1 | |
| Desmophen 1300 BA | 41.0 |
| NC Chips E 510 ESO (Dow) | 4.1 |
| Butyl acetate | 15.5 |
| Methyl isobutyl ketone | 10.5 |
| Methyl ethyl ketone | 16.7 |
| Dowanol MPA | 11.9 |
| BYK-323 | 0.3 |
| B) Component 2 | |
| Desmodur HL 60 BA | 60 |
| Dowanol PMA | 14 |
| Butyl acetate | 26 |

Desmophen 1300 BA (Bayer Material Science): polyester poly resin
NC Chips E 510 ESO (DOW): cellulose nitrate
BYK-323: aralkyl-modified polymethylalkylsiloxane
Desmodur HL 60 BA (Bayer Material Science): aromatic/aliphatic polyisocyanate based on toluene diisocyanate/hexamethylene diisocyanate The constituents of component 1 of coating system 3 were mixed gradually in the order stated above, with stirring, in a dissolver. Then different matting agents from those indicated under A) were added, and dispersion took place for 10 minutes with stirring. The matting agents used and also their weight fractions (wt %), in each case based on the total weight of the respective formulation, can be seen in Table 12. To prepare component 2 of coating system 3, the constituents indicated in Table 11 B) were mixed gradually in the order stated above, with stirring, in a dissolver. Immediately prior to application, the two components were mixed in a proportion (mass ratio) of component 1/component 2=2/1.

The coating compositions thus produced were applied using a 100 μm wire doctor to contrast charts, and using a 100 μm four-way bar applicator to glass plates. Additionally the coating compositions were cast onto polyester films (Melinex O).

The samples were subsequently stored at 25° C. for 24 hours, for the coating compositions to cure, thus producing the coatings on the substrates.

Table 12 summarizes the properties and test results found for the coatings produced.

TABLE 12

Properties of coatings based on coating system 3

| | | | Gloss 60° | | | |
|---|---|---|---|---|---|---|
| | Haze | DOI | before SATRA | after SATRA | SATRA, cycles | COF |
| Control (no matting agent) | 7 | 99 | 98 | 98 | 500 | 0.16 |
| 2% Example 1 | 22 | 85 | 55 | 66 | 4000 | 0.14 |
| 2% CERAFLOUR 988 | 23 | 72 | 53 | 60 | 4000 | 0.12 |
| 2% CERAFLOUR 996 | 21 | 75 | 55 | 63 | 2000 | 0.14 |
| 2% CERAFLOUR 994 | 21 | 64 | 57 | 68 | 2000 | 0.12 |
| 2% CERAFLOUR 990 | 22 | 73 | 56 | 64 | 4000 | 0.13 |

Various properties of the coatings of the invention are better than or comparable with those of the conventional coatings which comprise matting agents based on petrochemical raw materials. In the coatings according to the invention, accordingly, the proportion of petrochemical materials is reduced, and the outstanding properties shown are nevertheless obtained.

The invention claimed is:

1. A coating composition comprising polyhydroxyalkanoate particles, wherein the coating composition comprises 0.01-10 wt % of polyhydroxyalkanoate particles, based in each case on the total amount of the coating composition, wherein the polyhydroxyalkanoate particles have a particle size $d_{50}$ of 0.5 μm to 7 μm, and the coating composition comprises at least one self-crosslinking or externally crosslinking polymeric resin as binder selected from the group of polyurethane, polyester, polyester polyol, acrylic, polyacrylate, polymethacrylate, polyester acrylate, epoxy and/or alkyd resins and optionally at least one crosslinking agent in a total fraction of 15 to 99.5 wt % and at least one solvent in a fraction of 0 to 84.99 wt %, based in each case on the total amount of the coating composition, and the coating composition is a chemically curable and/or radiation-curing coating composition.

2. The coating composition as claimed in claim 1, wherein the polyhydroxyalkanoates comprise at least one kind of the following structures as monomer unit:

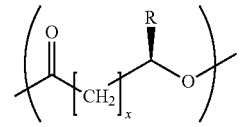

where:
x=1, 2, 3, or 4;
R=H, alkyl, aryl, alkenyl, aralkyl, haloalkyl, halogen, or cyano, or radical containing epoxy groups, ether groups, acyl groups, ester groups and/or carboxyl groups.

3. The coating composition as claimed in claim 1, wherein the polyhydroxyalkanoates are polymers and/or copolymers selected from the group consisting of poly-3-hydroxybutyrate, poly-3-hydroxybutyrate-co-3-hydroxyvalerate, poly-3-hydroxybutyrate-co-4-hydroxybutyrate, and poly-3-hydroxybutyrate-co-3-hydroxyvalerate-co-4-hydroxybutyrate.

4. The coating composition as claimed in claim 1, wherein it comprises polyhydroxyalkanoates as matting agents.

5. A coating produced on a substrate with a coating composition as claimed in claim 1.

6. The coating composition as claimed in claim 1, wherein the polyhydroxyalkanoates are matting agents, improve the tactile qualities of the coating composition, influence the viscosity of the coating composition, improve the scratch resistance of the coating composition, are flow control additives and/or improve the blocking resistance of the coating composition.

7. The coating composition as claimed in claim 2, wherein x=1 or 2 and R=H or alkyl.

8. The coating composition as claimed in claim 1, wherein the polyhydroxyalkanoates comprise one or more blocks constructed from monomers, the monomers being selected from the group consisting of 3-hydroxybutanoic acid, 4-hydroxybutanoic acid, 3-hydroxyvaleric acid, 3-hydroxyhexanoic acid and 3-hydroxyoctanoic acid.

9. The coating composition as claimed in claim 1, wherein the polyhydroxyalkanoates improve the tactile qualities of a coating, influence the viscosity of the coating composition, improve the scratch resistance of a coating, control the flow of the coating composition, and/or improve the blocking resistance of a coating.

10. The coating composition of claim 1, wherein the coating composition cures to an optically matte finish.

11. The coating composition of claim 1, wherein the coating composition comprises at least one self-crosslinking or externally crosslinking polymeric resin as binder selected from the group of polyurethane, polyester, polyester polyol, acrylic, polyacrylate, polymethacrylate, polyester acrylate, epoxy and/or alkyd resins and optionally at least one crosslinking agent in a total fraction of 25 to 99.5 wt %.

* * * * *